United States Patent
Mizuno

(10) Patent No.: US 10,257,374 B2
(45) Date of Patent: Apr. 9, 2019

(54) IMAGE FORMING APPARATUS, METHOD FOR CONTROLLING IMAGE FORMING APPARATUS, AND PROGRAM

(71) Applicant: CANON KABUSHIKI KAISHA, Tokyo (JP)

(72) Inventor: Takafumi Mizuno, Higashimurayama (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 322 days.

(21) Appl. No.: 14/747,991

(22) Filed: Jun. 23, 2015

(65) Prior Publication Data

US 2015/0381834 A1    Dec. 31, 2015

(30) Foreign Application Priority Data

Jun. 25, 2014 (JP) ................... 2014-129886

(51) Int. Cl.
*H04N 1/00* (2006.01)
*G06F 3/0484* (2013.01)

(52) U.S. Cl.
CPC ....... *H04N 1/00517* (2013.01); *G06F 3/0484* (2013.01); *H04N 1/00509* (2013.01); *H04N 2201/0094* (2013.01)

(58) Field of Classification Search
None
See application file for complete search history.

(56) References Cited

U.S. PATENT DOCUMENTS

| | | | |
|---|---|---|---|
| 8,527,984 B2* | 9/2013 | Ikeda | G06F 8/61 707/813 |
| 2007/0055840 A1 | 3/2007 | Yamamoto et al. | |
| 2012/0167201 A1* | 6/2012 | Maeda | H04N 1/00474 726/17 |
| 2014/0304805 A1* | 10/2014 | Mitsui | G06F 21/31 726/16 |
| 2014/0362389 A1* | 12/2014 | Namiki | G06K 15/1878 358/1.9 |
| 2015/0012720 A1* | 1/2015 | Tanba | G06F 3/0604 711/171 |
| 2015/0029539 A1* | 1/2015 | Kim | G06K 15/005 358/1.15 |

FOREIGN PATENT DOCUMENTS

| | | |
|---|---|---|
| CN | 1794206 A | 6/2006 |
| CN | 101819554 A | 9/2010 |
| JP | 2004-213356 A | 7/2004 |
| JP | 2004213356 * | 7/2004 |
| JP | 2006231760 * | 9/2006 |

* cited by examiner

*Primary Examiner* — Fan Zhang
(74) *Attorney, Agent, or Firm* — Canon U.S.A., Inc. IP Division

(57) ABSTRACT

An image forming apparatus includes a storage unit that stores a personal setting value of a user, a reception unit that receives a login of the user, and a control unit that that determines whether the personal setting value of the user whose login is received can be stored in the storage unit, and in a case where it is determined that the personal setting value cannot be stored and registration of the personal setting value is instructed by the user whose login is received, performs control so as to store the personal setting value of which the registration is instructed in a virtual storage area prepared for temporary storage.

10 Claims, 12 Drawing Sheets

UPPER LIMIT MANAGEMENT TABLE

| | |
|---|---|
| MAXIMUM NUMBER OF USERS | 5 |
| MAXIMUM DATA SIZE FOR ONE USER | 1 MB |
| SIZE OF ENTIRE STORAGE CAPACITY | 10 MB |

VIRTUAL STORAGE AREA USE FLAG

| |
|---|
| ON |

FIG.5A

UPPER LIMIT MANAGEMENT TABLE

| | |
|---|---|
| MAXIMUM NUMBER OF USERS | 5 |
| MAXIMUM DATA SIZE FOR ONE USER | 1 MB |
| SIZE OF ENTIRE STORAGE CAPACITY | 10 MB |

FIG.5B

USER INFORMATION TABLE

| | | |
|---|---|---|
| NUMBER OF REGISTERED USERS | 5 | |
| IDENTIFIER OF USER A | 50 KB | NOVEMBER 7, 2013 |
| IDENTIFIER OF USER B | 1 MB | OCTOBER 3, 2013 |
| IDENTIFIER OF USER C | 130 KB | AUGUST 18, 2013 |
| IDENTIFIER OF USER D | 720 KB | OCTOBER 24, 2013 |
| IDENTIFIER OF USER E | 320 KB | NOVEMBER 1, 2013 |

FIG.5C

SETTING VALUE MANAGEMENT TABLE

| | |
|---|---|
| OCCUPIED STORAGE CAPACITY | 8 MB |
| THRESHOLD VALUE FOR VIRTUAL STORAGE USE | 30% |

FIG.5D

VIRTUAL STORAGE TARGET LIST TABLE

| | |
|---|---|
| /DISPLAY SETTING/LANGUAGE | ~801 |
| /COPY | ~802 |
| /TRANSMISSION/HISTORY | ~803 |

FIG.5E

VIRTUAL STORAGE AREA USE FLAG

| |
|---|
| ON |

FIG.7

! PERSONAL SETTING VALUE CANNOT BE STORED
DUE TO INSUFFICIENT STORAGE AREA.

FOR SETTING VALUE STORED AT OR BEFORE
PREVIOUS LOGIN, ONLY REFERENCE IS ALLOWED.

HOWEVER, HISTORY OF COPY FUNCTION, TRANSMISSION
FUNCTION, OR BOX FUNCTION IS STORED AND CAN BE
REUSED ONLY WHILE YOU ARE LOGGING IN (HISTORY
WILL BE DELETED UPON YOUR LOGOUT).

OK

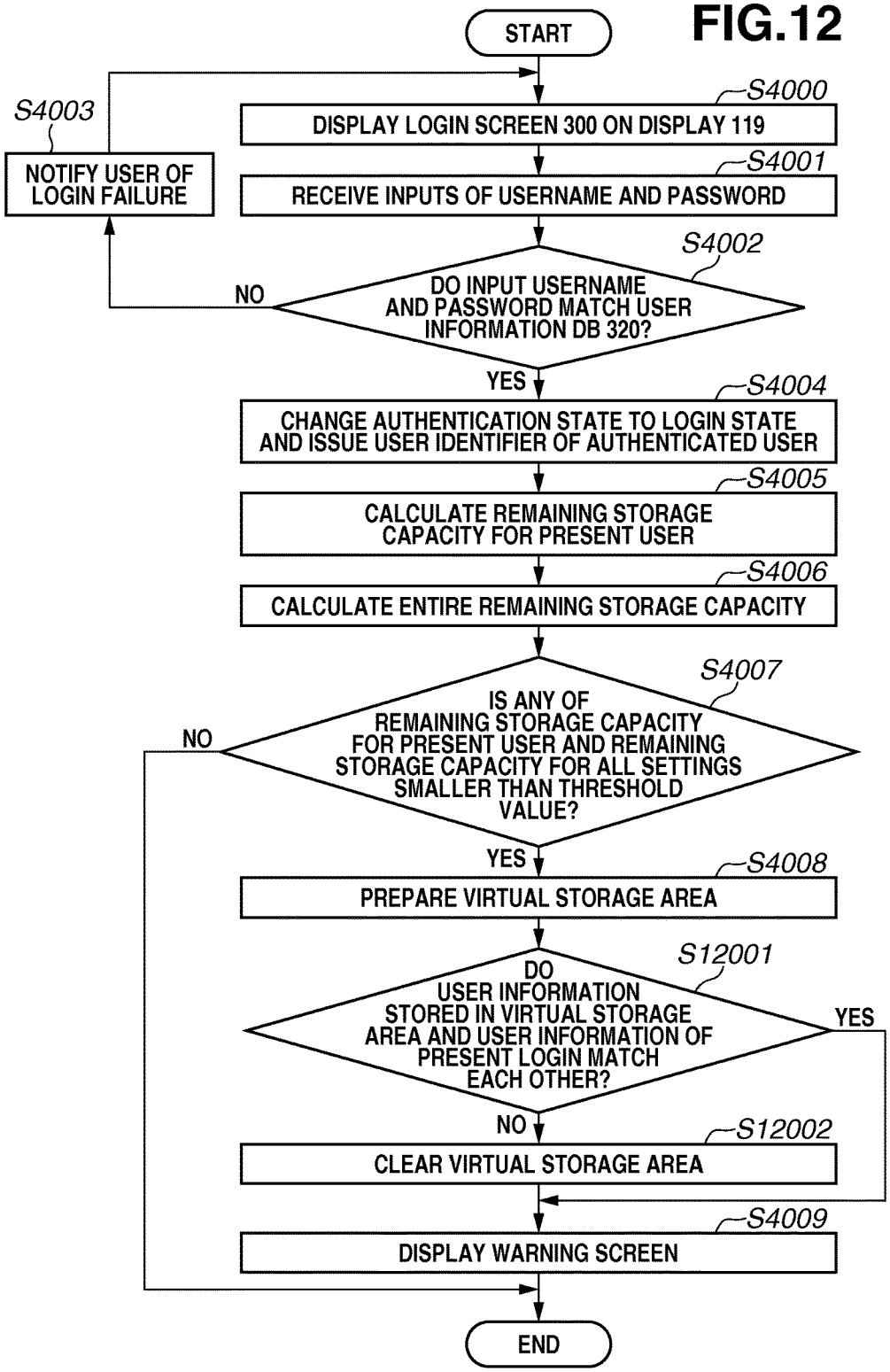

IMAGE FORMING APPARATUS, METHOD FOR CONTROLLING IMAGE FORMING APPARATUS, AND PROGRAM

BACKGROUND

Field

Aspects of the present invention generally relate to an image forming apparatus, a method for controlling an image forming apparatus, and a program for storing a personal setting value for individual users and changing a default value and a behavior of processing according to the personal setting value.

Description of the Related Art

In recent years, image forming apparatuses have been provided with various functions, and contents of operations performed by users have been also becoming complicated. Generally, such an image forming apparatus is often shared among a plurality of users. Therefore, an automatic clear function of automatically clearing a setting value after a predetermined time period has elapsed is used. After a user changes a setting, this automatic clear function prevents a next user from using the image forming apparatus without noticing the changed setting. Such a use configuration requires a user to select a desired setting screen from an initial menu of the image forming apparatus each time the user starts to use the image forming apparatus. Therefore, even when an individual user normally uses a fixed setting, the user has to bother to configure the same setting every time.

Therefore, there is proposed an image forming apparatus that stores a setting for each individual in the image forming apparatus to provide an environment user-friendly to each individual user.

For example, if a user A logs in with a layout setting set to "1-in-1" and a finishing setting set to "no finishing" as default values of job settings of a copy function for the user A, the user A can use the copy function with these settings. Further, if another user B logs in with the layout setting set to "2-in-1" and the finishing setting set to "top right stapling" as default values of the default job settings of the copy function for the user B, the user B can use the copy function with these settings.

Further, as another example, even when a display language is set to "Japanese" in the image forming apparatus, by setting the display language to "English" as a personal setting for the user A who wants to use the image forming apparatus with the display language set to "English", when the user A logs in, the display language setting is switched to "English" first and each function is displayed in English.

In this manner, there is implementation of storing the setting for each individual in the image forming apparatus, and providing the environment user-friendly to each individual user.

In the case where the image forming apparatus is configured to store the setting for each user therein, this configuration results in registration of a large number of personal setting values with the single image forming apparatus. Further, the image forming apparatus is often fixedly placed on a floor of an office, and accordingly the single image forming apparatus is used by an extremely large number of users due to personnel transfers and newly-hired employees. As a result, a large number of settings are stored therein.

The image forming apparatus has a limited resource as a storage capacity thereof, and there is a function of imposing an upper limit on a capacity for setting values storable by one user (a quota function).

Japanese Patent Application Laid-Open No. 2004-213356 discusses a technique for limiting access to data upon exceeding a storage capacity for each individual in a data storage service for storing data for each user.

SUMMARY

Aspects of the present invention are generally directed to a mechanism for storing or deleting a personal setting value without requiring a user to spend time and effort.

According to an aspect of the present invention, an image forming apparatus includes a storage unit configured to store a personal setting value of a user, a reception unit configured to receive a login of the user, and a control unit configured to determine whether the personal setting value of the user whose login is received by the reception unit can be stored in the storage unit, and in a case where it is determined that the personal setting value cannot be stored and registration of the personal setting value is instructed by the user whose login is received, perform control so as to store the personal setting value of which the registration is instructed in a virtual storage area.

Further features of the present disclosure will become apparent from the following description of exemplary embodiments with reference to the attached drawings.

BRIEF DESCRIPTION OF THE DRAWINGS

FIGS. 5A to 5D each illustrate an example of a setting value management table. FIG. 5E illustrates an example of a virtual storage area use flag.

FIG. 7 illustrates an example of a warning screen.

FIG. 12 is a flowchart illustrating an example of login processing according to a fourth exemplary embodiment.

DESCRIPTION OF THE EMBODIMENTS

Various exemplary embodiments will be described in detail below with reference to the drawings.

Figure 1:
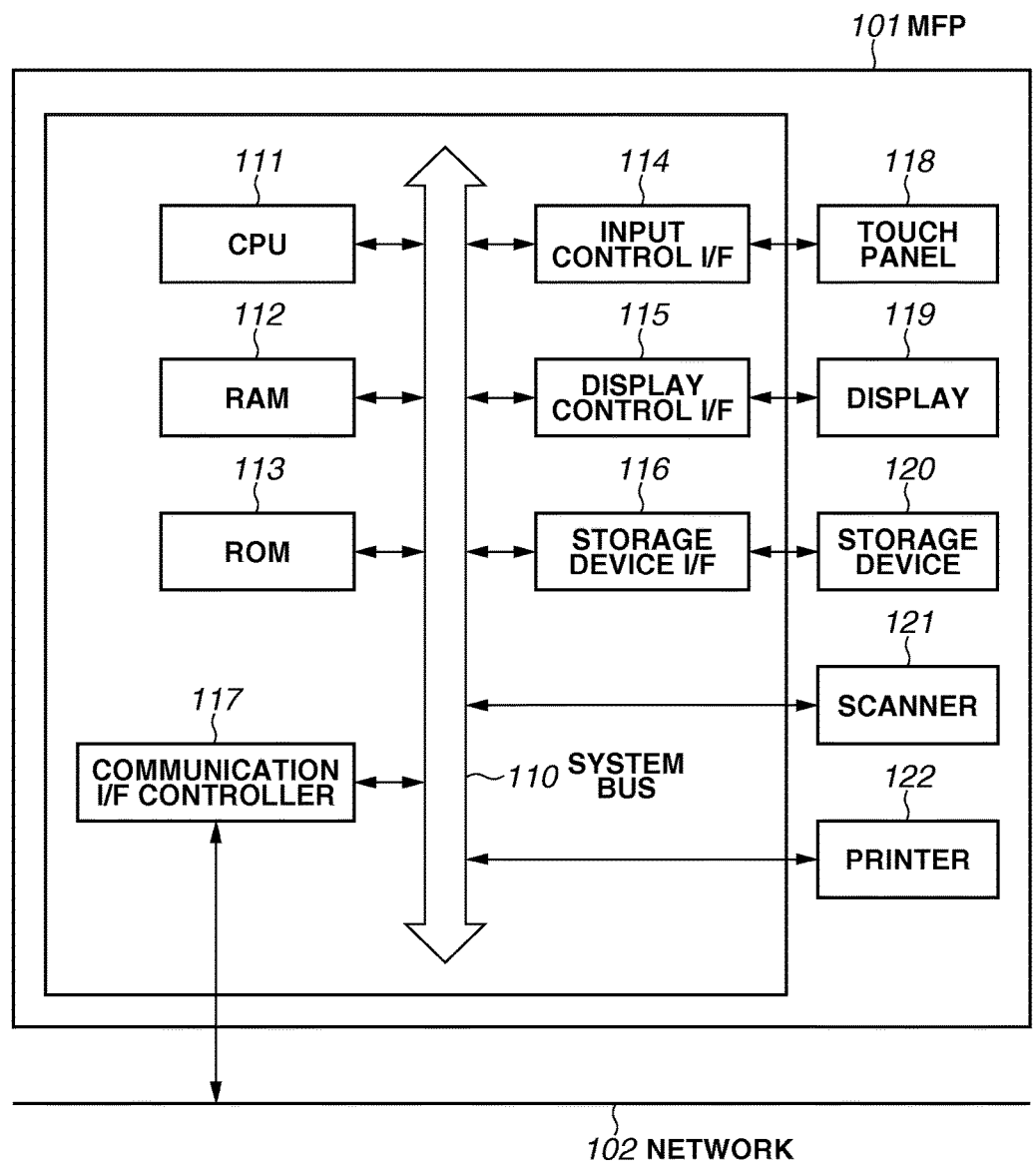
FIG. 1 illustrates an example of a hardware configuration of an image forming apparatus according to an exemplary embodiment.

FIG. 1 illustrates an example of a hardware configuration of an image forming apparatus according to a first exemplary embodiment.

FIG. 1 illustrates a multi-function peripheral (MFP) 101. The MFP 101 is an example of the image forming apparatus according to the present exemplary embodiment.

In the MFP 101, a central processing unit (CPU) 111, a random access memory (RAM) 112, a read only memory (ROM) 113, an input control interface (I/F) 114, a display control I/F 115, a storage device I/F 116, and a communication I/F controller 117 are connected to a system bus 110. Further, a scanner 121 and a printer 122 are also connected to the system bus 110. The units connected to the system bus 110 are configured to be able to exchange data with one another via the system bus 110.

The CPU 111 is a device that controls each device, and calculates/processes data. The RAM 112 is a volatile memory, and is used as a temporary storage area, such as a main memory and a work area of the CPU 111. The ROM 113 is a nonvolatile memory. Image data, other data, various kinds of programs that allow the CPU 111 to operate, and the like are stored in respective predetermined areas in the ROM 113. The CPU 111 controls each unit of the MFP 101 with use of the RAM 112 as the work memory according to, for example, the program stored in the ROM 113. The programs that allow the CPU 111 to operate do not necessarily have to be stored in the ROM 113, and may be stored in a storage device 120.

The input control I/F 114 is an interface that receives a user operation from a touch panel 118 or the like, generates a control signal according to the operation, and supplies the control signal to the CPU 111. For example, the input control I/F 114 is connected to a not-illustrated character information input device such as a keyboard, a not-illustrated hard key for directly inputting a numeric value or the like, a pointing device such as the touch panel 118, or the like, as an input device that receives the user operation. The touch panel 118 is, for example, an input device configured to output coordinate information according to a position at which a user touches a planarly configured input portion. Hereinafter, the present exemplary embodiment will be described presuming that an operation is performed on the touch panel 118, but performing an operation is not limited to being performed on a touch panel and any method enabling performing an operation is applicable.

The CPU 111 controls each unit of the MFP 101 according to the program, based on the control signal generated and supplied by the input control I/F 114 according to the user operation performed on the input device. Through such control, the CPU 111 can operate the MFP 101 according to the user operation.

The display control I/F 115 is an interface that outputs a display signal for causing an image to be displayed on a display 119. For example, the CPU 111 supplies a generated display control signal to the display control I/F 115 according to the program. The display control I/F 115 generates the display signal based on this display control signal to output the display signal to the display 119. For example, the display control I/F 115 displays, on the display 119, a graphical user interface (GUI) screen that forms a GUI, based on the display control signal generated by the CPU 111. The touch panel 118 may be configured integrally with the display 119. For example, the touch panel 118 is configured to have an optical transmittance that does not block the display of the display 119, and is mounted on a top layer of a display surface of the display 119. Then, an input coordinate on the touch panel 118 and a display coordinate on the display 119 are associated with each other as corresponding coordinates. This configuration can achieve the GUI configured to appear as if the user can directly operate a screen displayed on the display 119.

The storage device I/F 116 is an interface that connects the storage device 120 such as a hard disk drive (HDD) and a flash memory. Based on the control by the CPU 111, the storage device I/F 116 reads data from the storage device 120, and writes data into the storage device 120. The storage device 120 may be used in place of the RAM 112 or the ROM 113.

The communication I/F controller 117 is an interface that performs communication to various types of networks such as a local area network (LAN), the Internet, a wired network, and a wireless network, based on the control by the CPU 111. Various apparatuses such as a personal computer (PC), another MFP, a printer, and a server are connected to a network 102 in such a manner that these apparatuses can communicate with the MFP 101. Further, a connection to an external authentication server, which will be described below, is also performed via the communication I/F controller 117.

The scanner 121 reads a document and generates image data, based on the control by the CPU 111. For example, the CPU 111 causes the scanner 121 to perform scan processing, according to a user's instruction input via the input control I/F 114. The scanner 121 reads a document placed on a platen or an automatic document feeder (ADF), and digitizes the document into digital data to generate the image data. Then, the scanner 121 stores the generated image data into the storage device 120 via the storage device I/F 116.

The printer 122 prints image data stored in the storage device 120, based on the control by the CPU 111. For example, the CPU 111 causes the printer 122 to perform print processing, according to a user's instruction input via the input control I/F 114 or a command instruction input from an external apparatus via the communication I/F controller 117. The printer 122 reads the image data from the storage device 120, converts the image data into a printable data format, and then prints the converted data on a paper document.

Figure 2:
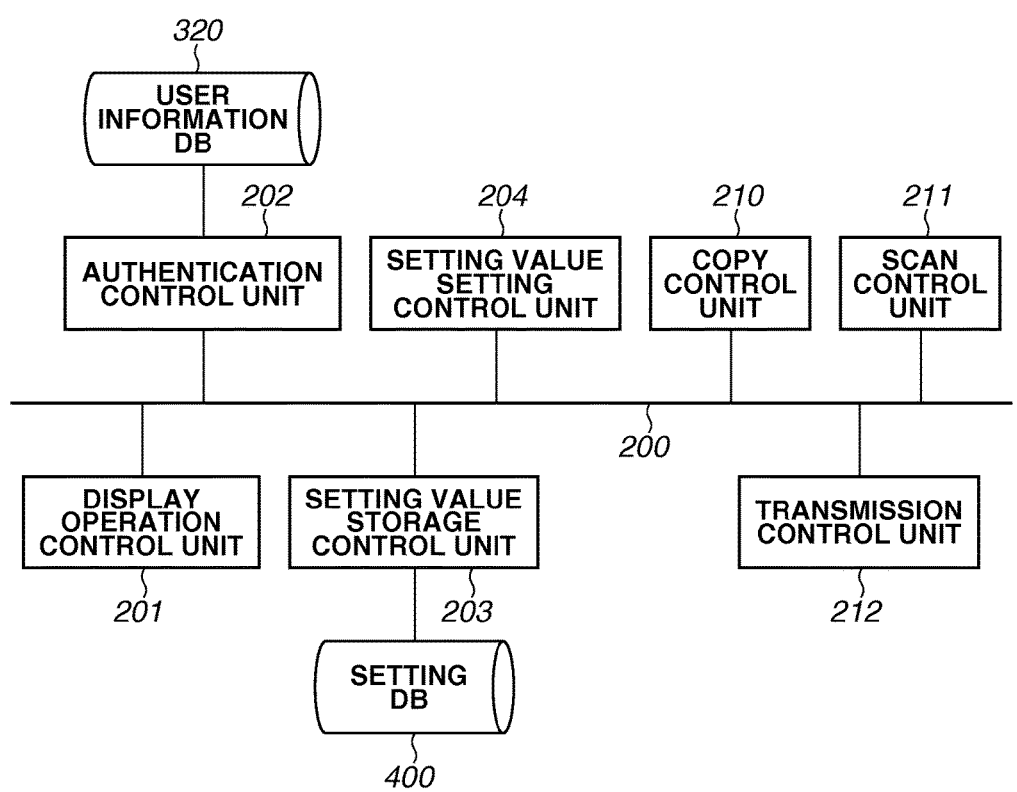
FIG. 2 illustrates an example of a software configuration of a multi-function peripheral (MFP).

FIG. 2 illustrates an example of a software configuration of the MFP 101. The configuration illustrated in FIG. 2 indicates merely an example for describing the present exemplary embodiment, and it is apparent that the configuration of the present exemplary embodiment may include components other than the illustrated components, or may be a configuration capable of providing an effect similar to the present exemplary embodiment.

The CPU 111 loads the program stored in the ROM 113 or the storage device 120 into the RAM 112 and executes the program as necessary, for example, when the MFP 101 is started up or a function is used, whereby a corresponding control unit illustrated in FIG. 2 is realized.

The MFP 101 has one or more function(s) (hereinafter referred to as a Function or Functions) such as the copy function, a scan function, and a facsimile function, and a control unit is prepared for each Function.

FIG. 2 illustrates a copy control unit 210, a scan control unit 211, and a transmission control unit 212 as an example thereof. It is apparent that the MFP 101 may have other Functions regarding processing of the MFP 101 than the Functions illustrated in FIG. 2, and may include a control unit for this Function.

A display operation control unit 201 controls the input control I/F 114 and the display control I/F 115 based on the control by the CPU 111. For example, the display operation control unit 201 performs a display on the display 119 via the display control I/F 115 based on an instruction issued from another control unit, and acquires information that the user inputs on the touch panel 118 via the input control I/F 114. The display operation control unit 201 notifies a corresponding control unit of the acquired information via a control bus 200 as necessary.

Hereinafter, the present exemplary embodiment will be described assuming that information or data is exchanged via the control bus 200 when being transmitted and received between the control units.

Based on the control by the CPU 111, the authentication control unit 202 performs authentication processing for identifying a user to determine whether an operator of the MFP 101 is a valid user of the MFP 101. A term "login" will be used to refer to performing the authentication processing and starting a session if the operator is the valid user. Further, the authentication control unit 202 controls a database (hereinafter referred to as a user information database (DB) 320) that stores user information in the storage device 120. The MFP 101 may be configured in such a manner that the authentication control unit 202 connects to an external authentication server via the communication I/F controller 117, and uses a result of authentication by the external authentication server, in addition to the user information DB 320 within the MFP 101. The authentication information is exchanged between the authentication control unit 202 and the external authentication server with use of a known technique. Further, a term "logout" will be used to refer to ending a session of a user when this user ends use of the MFP 101. Processing for the login and processing for the logout will be described below.

Further, the authentication control unit 202 provides a function of, for example, registering a user, deleting a user, and updating user information. Further, the authentication control unit 202 may provide a group function. A group means a set of a plurality of users, and a plurality of groups can be registered. A user can belong to zero or more groups. The authentication control unit 202 also provides a function of, for example, registering a group, deleting a group, updating group information, adding a user to a group, and removing a user from a group. The authentication control unit 202 stores, in the user information DB 320, an identifier (hereinafter referred to as a user identifier) for uniquely identifying a user, and an identifier (hereinafter referred to as a group identifier) for uniquely identifying a group. The user information DB 320 is stored in, for example, the storage device 120.

Next, a setting value storage control unit 203 will be described.

The setting value storage control unit 203 is a control unit for storing a device setting value, a personal setting value, and a group setting value based on the control by the CPU 111. The device setting value is a setting that all users refer to. Further, the personal setting value is a setting that only each user can refer to. Further, the group setting value is a setting that only users belonging to each group can refer to.

The setting value storage control unit 203 performs control of storing the device setting value, the personal setting value, and the group setting value into a setting DB 400 in the storage device 120. The setting DB 400 is stored in, for example, the storage device 120. The setting DB 400 has a virtual storage area (also referred to as a virtual save area) for temporarily storing the personal setting value and the group setting value when they cannot be stored. This virtual storage area is provided in the storage device 120, but may be provided in the RAM 112 in a case where the RAM 112 has a sufficient capacity. The setting value storage control unit 203 also accesses this virtual storage area. The details of the virtual storage area will be described below. A setting value setting control unit 204 is used to set a setting value into the setting value storage control unit 203.

The setting value setting control unit 204 has a function for registering/changing a value of the device setting value and a value of the personal setting value, and receives an input from a user via the touch panel 118 to store the input into the setting DB 400 via the setting value storage control unit 203. At this time, the setting value setting control unit 204 receives the input while determining which setting value is input by the user, among the device setting value, the personal setting value, and the group setting value, and sets the setting value corresponding to each of them. Further, the setting value setting control unit 204 also performs access control such as determining whether to store the setting value into the above-described virtual storage area, or permitting only acquisition of the setting value.

A predetermined size of the virtual storage area is constantly secured in the setting DB 400, and this area is never lost. Further, the virtual storage area is never be used up during a user's operation, because, normally, the size of the secured virtual storage area corresponds to an upper limit imposed on setting values storable by the user. In the present exemplary embodiment, this virtual storage area will be described based on the personal setting value by way of example, but it is apparent that the virtual storage area can be also prepared for the group setting value, and a mechanism for achieving temporary storage can be also provided for the group setting value.

Figure 3:
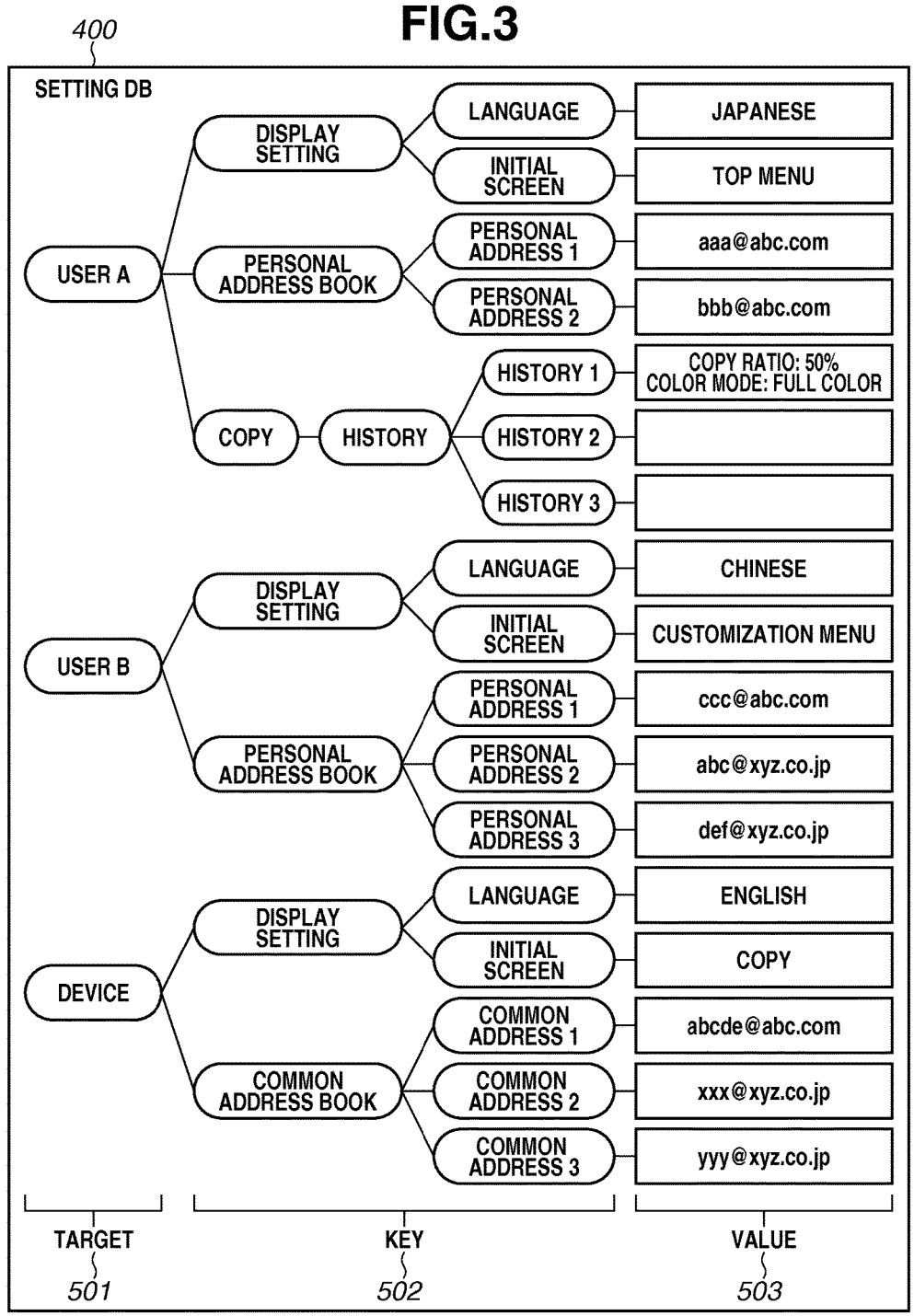
FIG. 3 illustrates an example of a data structure of a setting database (DB).

FIG. 3 illustrates an example of a data structure of the setting DB 400.

The setting DB 400 stores a key for identifying a setting value, and a value of the setting value as a pair. The setting DB 400 is expressed by a hierarchical structure like, for example, the structure illustrated in FIG. 3.

Information about a target 501 is placed in a first hierarchical level. The target 501 is information for identifying whether the setting value is the device setting value or the personal setting value. In FIG. 3, "device" is set as the information for identifying the device, and "user A" and "user B" are set as the user identifiers of the user A and the user B, respectively. A corresponding value 503 is determined based on a combination of the target 501 and a key 502.

In the example illustrated in FIG. 3, a value corresponding to the target "user A" and a key "/display setting/language" is "Japanese". A value corresponding to the target "user B" and the key "/display setting/language" is "Chinese". Further, a value corresponding to the target "user B" and a key "/personal address book/personal address 1" is "ccc@abc.com". While such personal setting values are stored as many as the number of users, there is only a single setting value in the MFP 101 as the device setting value. In the case of the example illustrated in FIG. 3, a value corresponding to the target "device" and the key "/display setting/language" is "English".

Among the settings, some have a same key between the personal setting value and the device setting value while others do not have a same key between the personal setting value and the device setting value. For the settings having the same key between the personal setting value and the device setting value, the device setting value may be treated as an initial value when the personal setting value is not registered. Referring to the example illustrated in FIG. 3, suppose that no personal setting value is registered for a user C. In this case, "English", which is the device setting value, is used as the display language for the user C.

Further, for the settings that do not have the same key between the personal setting value and the device setting value, the personal setting value is treated as being unregistered or the number of registered personal setting values is regarded as zero. For example, a key "personal address book" is a key prepared only for a setting with an "individual" specified as the target 501 (the address book will be described below). On the contrary, a key "common address book" is a key prepared only for a setting with the "device" specified as the target 501. In the example illustrated in FIG. 3, the number of addresses registered with the personal address book of the user C is assumed to be zero. However, there is the device setting value. Consequently, the user C can refer to a common address 1, a common address 2, and a common address 3 in the common address book.

The setting value storage control unit 203 illustrated in FIG. 2 reads the personal setting value in the setting DB 400 when a user logs in, and reflects the personal setting value in each setting of the MFP 101. Therefore, the user can use the MFP 101 customized according to the personal setting value registered by the user himself/herself by only logging in. Further, the setting value storage control unit 203 reads the device setting value in the setting DB 400 when the user logs out, and reflects the device setting value in each setting of the MFP 101. Therefore, a function permitted to be used in a not-login state can be used with the setting common in the device.

The display language setting will be described as an example of the personal setting value. Assume that the setting DB 400 is in the state illustrated in FIG. 3. The display language setting registered as the device setting value, which is indicated by the value corresponding to the target "device" and the key "/display setting/language", is "English". On the other hand, the display language for the user A, which is indicated by the value corresponding to the target "user A" and the key "/display setting/language", is "Japanese". The device setting value is valid on a login screen that is displayed in the not-login state, so the display is performed with the display language set to "English". When the user A performs login processing, and is successfully authenticated, the display language setting for the user A is reflected and the display language is switched to "Japanese" in the login state. Further, when the user A logs out, the display language setting for the device is reflected and the display is performed with the display language set to "English" on the login screen.

Further, there is a history function of each Function as an example of the personal setting value automatically stored by an application. For example, suppose that a copy job is carried out by the copy function with a copy ratio set at "50%" and a color mode set to "full color". These settings "copy ratio: 50% and color mode: full color" are recorded as a history of the copy function in the personal setting values. The number of histories that can be registered is not only one, and a plurality of histories can be registered. For example, the present exemplary embodiment is constructed assuming that three histories can be stored, but the number of histories that can be stored is not limited to three. In the above-described example illustrated in FIG. 3, the user A has ever used the copy function once, and a history at this time is recorded as a history 1 (a history 2 and a history 3 are blank). The user B has never used the copy function, so a key "/copy" is not created for the user B.

This is an example of the settings for each user. Besides this, a keyboard setting, an accessibility setting, a Function to be displayed after a login, and the like can be customized as the personal setting values. Alternatively, personal data held for each Function, such as the address book for each individual, may be registered as the personal setting value. It is apparent that settings for each individual that are held by the MFP 101 other than these settings may be also registered.

Now, an example of login processing will be described with reference to FIG. 4.

Figure 4:
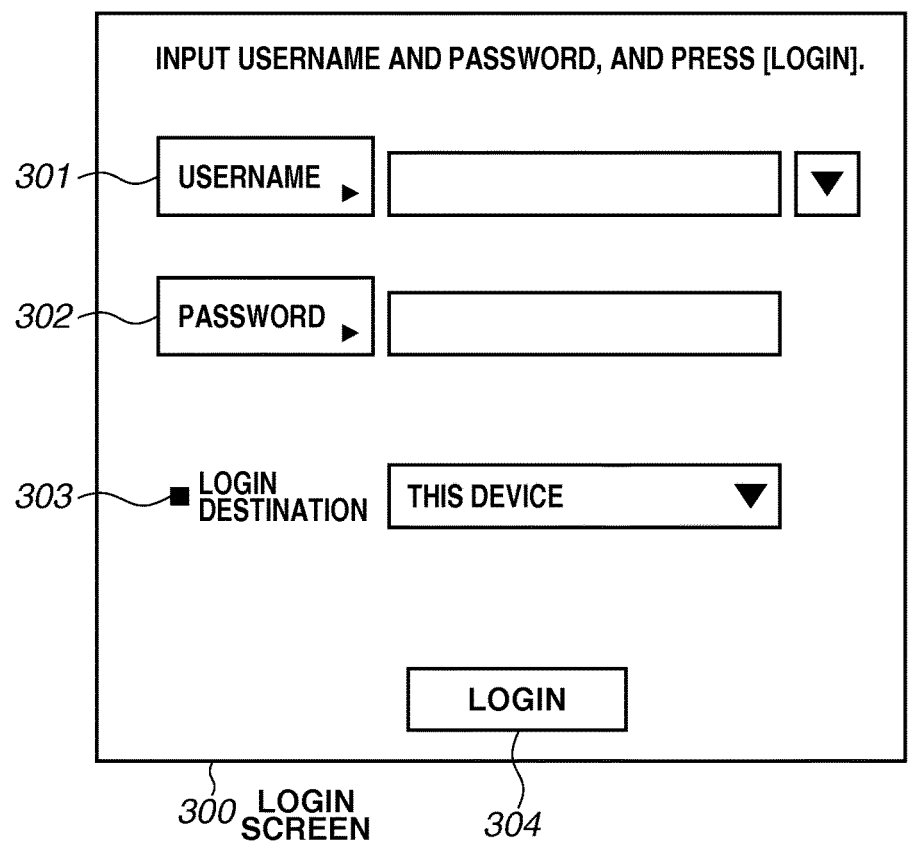
FIG. 4 illustrates an example of a login screen.

FIG. 4 illustrates an example of an input screen of a login screen 300.

In the screen example illustrated in FIG. 4, the login screen 300 includes a username input form 301, a password input form 302, a login destination selection button 303, and a login button 304.

A user inputs a username into the username input form 301, and inputs a corresponding password into the password input form 302. The login destination selection button 303 is used to select an authentication destination. If the user is to be authenticated with use of the user information DB 320 within the MFP 101, the user selects "THIS DEVICE" as illustrated in FIG. 4. If the user is to be authenticated by the external authentication server, the user selects a name of the external authentication server by the login destination selection button 303, and authentication is performed by the selected authentication server.

The setting value storage control unit 203 illustrated in FIG. 2 manages a maximum number of users that can be registered (or a maximum number of groups that can be registered), a maximum data size storable for one user (or a maximum data size storable for one group), a size of an entire storage capacity for storing the setting values, and the like. Further, the setting value storage control unit 203, for example, manages the number of registered users, the number of registered groups, a remaining storage capacity for each user, a remaining storage capacity for each group, and a storage capacity occupied by the stored setting values.

FIGS. 5A to 5D each illustrate an example of a management table of the setting value storage control unit 203. The respective management tables illustrated in FIGS. 5A, 5B, 5C, and 5D are stored in the storage device 120.

FIG. 5A illustrates an example of an upper limit management table.

In the example illustrated in FIG. 5A, the maximum number of users and the maximum data size that can be registered for one user are "5" and "1 MB", respectively. Further, the example illustrated in FIG. 5A indicates that the maximum size of the storage capacity available for storing all setting values including the users and the groups is "10 MB".

FIG. 5B illustrates an example of a user information table, which stores the number of users for which the setting values are already registered, a user identifier and a size of the stored setting value(s) for each of the registered users, and a last use date and time when the corresponding user has used a setting value last time.

In the example illustrated in FIG. 5B, the number of registered users is "5" users. Further, for example, the storage capacity occupied by the "user A" is "50 KB", and the last use date and time of the "user A" is "Nov. 7, 2013". For the users B, C, D, and E, respective occupied storage capacities and respective last use dates and times are also stored in a similar manner.

FIG. 5C illustrates an example of a setting value management table. This table stores a total size of the storage capacities used for the respective users to store the setting values, and a threshold value for determining whether to use the virtual storage area. In the example illustrated in FIG. 5C, the total size of the storage capacities is "8 MB", and the threshold value for determining whether to use the virtual storage area is "30%". The threshold value for determining whether to use the virtual storage area is "30%", which means that the virtual storage area will be used when the remaining capacity available for storing the setting values is "30%" or lower.

As indicated in the upper limit management table illustrated in FIG. 5A, an upper limit is imposed on the number of users whose setting values can be managed by the MFP 101. Therefore, the attempt to register setting values of users exceeding this upper limit in number results in an error. Therefore, even if a new user logs in with the number of users reaching the upper limit, this user cannot store a setting value.

In this case, an administrator has to delete data of an unnecessary user with use of a not-illustrated management tool to allow the new user to store the setting value. The administrator does not always delete the data of the unnecessary user immediately, and the new user cannot store the setting value during this period. In addition, the setting value cannot be stored when the occupied storage capacity reaches the upper limit according to the limitation imposed on the setting values storable by the user, or when the area for storing the personal setting values is filled up with no remaining capacity left. In the present exemplary embodiment, the virtual storage area is provided so as to allow the setting value to be temporarily stored even when the MFP 101 falls into such a situation.

The MFP 101 may be configured to use the virtual storage area not only when the occupied storage capacity reaches the upper limit imposed on the setting values storable by the user or the storable area is filled up with no remaining capacity left, but also when the remaining storage capacity is a predetermined size or smaller. This is because, if the virtual storage area is started to be used only after the occupied storage capacity reaches the upper limit, when there is only a small remaining capacity left, a necessary setting value may become unable to be stored while a user is logged in.

The virtual storage area is an area enabled from a user's login until a user's logout, and the content of the virtual storage area is deleted when a next user logs in regardless of whether the next user is the same user or a different user. Further, some setting values are stored in the virtual storage area while other setting values are not stored in the virtual storage area. For example, the above-described history of each Function is an example of the setting value to be stored in the virtual storage area because the history is supposed to be automatically stored and a user may use the history in expectation of this storage. Further, the address book for each individual is not stored in the virtual storage area because the address book is deleted upon a logout as described above even if the address book is stored in the virtual storage area, so that there is no point in storing it.

Next, the present exemplary embodiment will be described more specifically.

Suppose that the user B logs in. The upper limit management table illustrated in FIG. 5A indicates that the maximum data size for one user (quota) is "1 MB", and FIG. 5B indicates that the user B has already stored the setting values corresponding to "1 MB". Therefore, the user B cannot store a setting value anymore. At this time, the virtual storage area is enabled.

FIG. 5D illustrates a table (a virtual storage target list table) that stores a list (a virtual storage target list) of storage target data pieces to be stored in the virtual storage area.

In the present exemplary embodiment, only setting values of functions and items listed in the virtual storage target list table like the example illustrated in FIG. 5D can be stored in the virtual storage area as the storage target data. In the example illustrated in FIG. 5D, the virtual storage area can be used for "/display setting/language" (801), i.e., the display language, "/copy" (802), i.e., the copy function, and "/transmission/history" (803), i.e., the history of the transmission function.

The storage target data to be stored in the virtual storage area may be listed on a Function (function) basis, like "/copy" 802, or may be listed on an item basis, i.e., for each item within a Function, like "/display setting/language" 801 and "/transmission/history" 803. More specifically, in the case of "/copy" 802, the virtual storage area is accessed in association with all items that use personal setting values as the copy function. Further, in the case of "/transmission/history" 803, the virtual storage area is accessed only when the setting of the history of the transmission function is handled. When attempting to store a setting value regarding a function or an item other than the functions and the items listed in the virtual storage target list table into the virtual storage area, a user cannot store the setting value, resulting in an error.

Next, use of the virtual storage area will be described, introducing a specific example. The use of the virtual storage area will be described based on the copy function as the example.

When the copy function is called, if there is a history of the copy function stored as a personal setting value of the user B, this history of the copy function stored as the personal setting value of the user B is deleted. For example, suppose that "copy ratio: 50% and color: full color" is stored as a history of the copy function in the personal setting values of the user B. If the user B carries out the copy function with the copy ratio set at "100%" and the color mode set to "monochrome" in such a state that the user B cannot store a personal setting value, "copy ratio: 100% and color mode: monochrome" is recorded into the virtual storage area as a history of the copy function. When the user B logs out after that, the history of the copy function for the user B "copy ratio: 100% and color mode: monochrome" is deleted because the virtual storage area is enabled only while the user B is logged in as described above. After that, when the administrator secures the storage area by, for example, deleting an unnecessary setting value, the MFP 101 returns into a state in which the user B can store a personal setting value. Suppose that the user B logs in and calls the copy function at this time. Although the user B tries to carry out the copy function again with the same settings with use of the history because the user B has carried out the copy function last time with the settings "copy ratio: 100% and color mode: monochrome", the last history is deleted since this history has been stored in the virtual storage area. Then, if a personal setting value becomes available due to the increase in the capacity of the storage area, and accordingly the previous settings "copy ratio: 50% and color mode: full color" become available as the history, the user B is confused. Therefore, when each function is used in a state in which the virtual storage area is used, the MFP 101 deletes data of the target stored as a personal setting value of this user.

The data of the target stored as the personal setting value has been described to be deleted "when each function is used" in the above description, because a function unused in the state in which the virtual storage area is used does not cause a problem even though a previous setting can be used when the MFP 101 returns into the state in which a setting value of each individual can be used.

For example, suppose that a history of the transmission function "transmitted file: Portable Document Format (PDF), and destination: xxx@bbb.jp" is recorded as a personal setting value of the user B. Suppose that the occupied storage capacity then reaches the upper limit imposed on the setting values storable by the user B or the personal storage area is filled up, so that the MFP 101 enters the state in which the virtual storage area is used. Suppose that the user B logs in and uses only the copy function without using the transmission function at this time. After that, when the administrator, for example, deletes unnecessary data to increase a free space, thereby enabling the use of a personal setting value, the user B is not confused even though the personal setting value is used as the history of the transmission function, because the user B has not used the transmission function.

Further, the MFP 101 may be configured to store the setting value into the virtual storage area not only when the occupied storage capacity reaches the upper limit imposed on the setting values storable by the user, but also when the remaining storage capacity for the user is a predetermined size or smaller. Suppose that the MFP 101 is set so as to use the virtual storage area when the remaining storage capacity is "30%" or smaller by way of example.

In the example illustrated in FIG. 5A, since the maximum data size for one user (quota) is "1 MB" and the storage capacity occupied by the user D is "720 KB" according to FIG. 5B, the remaining storage capacity is "280 KB", which is smaller than "300 KB" corresponding to "30%" of "1 MB". The MFP 101 is set so as to use the virtual storage area in this case. This setting can reduce a possibility of becoming unable to store a personal setting value while a user is logged in.

A structure of the virtual storage area is similar to the structure illustrated in FIG. 3 except that only information for a single user who is currently logged in, and the setting value of the item specified as the storage target to be stored in the virtual storage area (the item listed in the virtual storage target list table) are recorded in the virtual storage area.

The size "1 MB" is equivalent to "1024 KB", but the present exemplary embodiment has been described assuming that "1 MB" is equal to "1000 KB" for simplification of a calculation. The same applies to the following description, so this conversion will not be specifically described again hereafter.

FIG. 5E illustrates an example of a virtual storage area use flag.

The virtual storage area use flag is stored in the setting DB 400.

When the virtual storage area is used, the setting value setting control unit 204 sets the virtual storage area use flag (sets the virtual storage area use flag to ON). On the other hand, when the virtual storage area is not used, the setting value setting control unit 204 does not set the virtual storage area use flag (sets the virtual storage area use flag to OFF). The details thereof will be described below.

Figure 6:
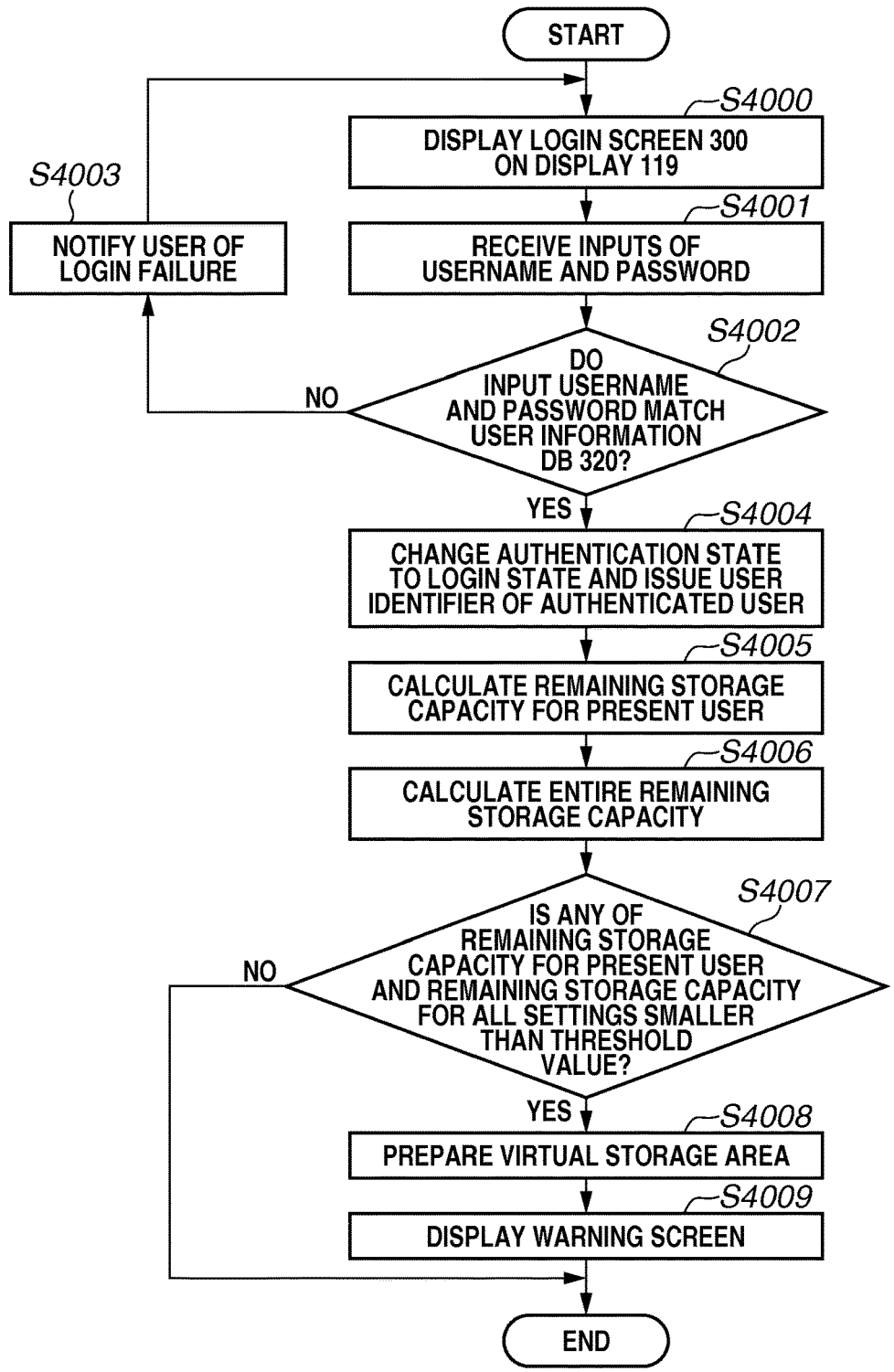
FIG. 6 is a flowchart illustrating an example of login processing according to a first exemplary embodiment.

FIG. 6 is a flowchart illustrating an example of processing performed when a user logs in to the MFP 101. The processing illustrated in this flowchart is performed by each control unit illustrated in FIG. 2. In other words, the CPU 111 executes the program stored in the ROM 113, whereby this processing is realized.

In step S4000, the display operation control unit 201 displays the login screen 300 like the example illustrated in FIG. 4 on the display 119 in a state in which a user can log in, for example, after a startup of the MFP 101 or after a logout. In step S4001, when the user performs input processing on the touch panel 118, the display operation control unit 201 receives a username and a password from the username input form 301 and the password input form 302, respectively, via the display control I/F 115. Then, the display operation control unit 201 requests the authentication control unit 202 to authenticate the user. The authentication control unit 202 issues a request for performing the following processing to each control unit.

In step S4002, the authentication control unit 202 receives the username and the password input in the above-described step S4001 from the display operation control unit 201, and checks whether the received username and password match the username and the password registered in the user information DB 320. The present example has been described assuming that the MFP 101 authenticates the user, but the external authentication server may authenticate the user. In the case where the external authentication server authenticates the user, in the above-described step S4002, the authentication control unit 202 encrypts or obfuscates the input username and password via the communication I/F controller 117. Further, the authentication control unit 202 requests the external authentication server to authenticate the encrypted or obfuscated information, and receives a result of the authentication from this authentication server.

If the authentication control unit 202 determines in the above-described step S4002 that the usernames and the passwords do not match (NO in step S4002), the authentication control unit 202 determines that the login has failed. Then, the processing proceeds to step S4003. In step S4003, the authentication control unit 202 notifies the user that the login has failed, via the display operation control unit 201, and then the MFP 101 returns into a login receiving state in step S4000.

On the other hand, if the authentication control unit 202 determines in the above-described step S4002 that the usernames and the passwords match (YES in step S4002), the authentication control unit 202 determines that the authentication has succeeded. Then the processing proceeds to step S4004. In step S4004, the authentication control unit 202 changes an authentication state from the not-login state to the login state, and issues a user identifier for uniquely identifying the authenticated user. Then, the processing proceeds to step S4005. In a case where the authenticated user belongs to a group, in the above-described step S4004, the authentication control unit 202 issues a group identifier for uniquely identifying the group to which the user belongs, although this case is not illustrated.

In step S4005, the setting value setting control unit 204 calculates a remaining storage capacity for the user who has logged in. More specifically, the setting value setting control unit 204 acquires the maximum data size for one user from the upper limit management table (FIG. 5A), and further acquires the size occupied by the stored setting value(s) corresponding to the user identifier issued in the above-described step S4004, from the user information table (FIG. 5B). Then, the setting value setting control unit 204 obtains a difference therebetween, thereby calculating the remaining storage capacity for this login user. In the example illustrated in FIGS. 5A and 5B, the setting value setting control unit 204 calculates the remaining storage capacity for the user D as "1 MB−720 KB=280 KB", since the maximum data size for one user is "1 MB" according to FIG. 5A and the size already occupied by the "user D" is "720 KB" according to FIG. 5B. In this manner, the setting value setting control unit 204 acquires the remaining capacity allocated to store the personal setting values of the user who is currently logged in.

Next, in step S4006, the setting value setting control unit 204 calculates a remaining storage capacity for all personal setting values. More specifically, the setting value setting control unit 204 acquires the data size of the entire storage capacity from the upper limit management table (FIG. 5A), and further acquires the size of the occupied storage capacity from the setting value management table (FIG. 5C). Then, the setting value setting control unit 204 obtains a difference therebetween, thereby calculating the remaining storage capacity for the all personal setting values. In the example illustrated in FIGS. 5A to 5C, the setting value setting control unit 204 calculates the remaining storage capacity as "10 MB−8 MB=2 MB" since the size of the entire storage capacity is "10 MB" according to FIG. 5A and the occupied storage capacity is "8 MB" according to FIG. 5C. In this manner, the setting value setting control unit 204 acquires the remaining capacity allocated to store the personal setting values in the setting DB 400. In other words, in the above-described steps S4005 and S4006, the setting value setting control unit 204 acquires information for determining the remaining capacity available for storing a personal setting value of the user who has logged in.

Next, in step S4007, the setting value setting control unit 204 determines whether any of the remaining storage capacity for the present user that has been calculated in the above-described step S4005, and the remaining storage capacity for the all personal setting values that has been calculated in the above-described step S4006 is smaller than a threshold value. More specifically, the setting value setting control unit 204 acquires the threshold value of the virtual storage area from the setting value management table (FIG. 5C), and the maximum data size for one user and the size of the entire storage capacity from the upper limit management table (FIG. 5A). Then, the setting value setting control unit 204 determines whether at least any one of the sizes acquired in the above-described steps S4005 and S4006 is smaller than respective sizes obtained by multiplying the acquired maximum data size for one user and size of the entire storage capacity by the threshold value of the virtual storage area.

In the example illustrated in FIGS. 5A to 5C, the maximum data size for one user is "1 MB", and the size of the entire storage capacity is "10 MB" according to FIG. 5A. The threshold value of the virtual storage area is "30%" according to FIG. 5C. Therefore, threshold values for the remaining storage capacity for the user and the remaining storage capacity for the all settings are determined to be "1 MB×0.3=0.3 MB (300 KB)" and "10 MB×0.3=3 MB", respectively. Therefore, the remaining storage capacity "280 KB" for the "user D" is smaller than the threshold value "300 KB", and the remaining storage capacity "2 MB" for the all settings is smaller than the threshold value "3 MB", which results in a determination of "YES" in step S4007.

If the setting value setting control unit 204 determines in the above-described step S4007 that both the remaining storage capacity for the user and the remaining storage capacity for the all settings are not smaller than the threshold values (NO in step S4007), the setting value setting control unit 204 ends the login processing.

On the other hand, if the setting value setting control unit 204 determines that at least one of the remaining storage capacity for the user and the remaining storage capacity for the all settings is smaller than the threshold value (YES in step S4007), the processing proceeds to step S4008.

In step S4008, the setting value setting control unit 204 instructs the setting value storage control unit 203 to prepare the virtual storage area. More specifically, the setting value setting control unit 204 sets the virtual storage area use flag (sets the virtual storage area use flag to ON) illustrated in FIG. 5E so as to use the virtual storage area secured in advance in the setting DB 400 in the setting value storage control unit 203. In other words, when the virtual storage area use flag is set (set to ON), the virtual storage area is used. On the other hand, when the virtual storage area use flag is not set (set to OFF), the virtual storage area is not used and a setting value is treated as a setting value of each individual. The virtual storage area use flag is not set at the time of a start of the login processing.

In the present exemplary embodiment, the virtual storage area is prepared when the remaining storage capacity for the user or the remaining storage capacity for the all settings is smaller than the threshold value. However, the virtual storage area may be prepared under conditions other than that. For example, when personal setting values of a predetermined number of users (five users in the example illustrated in FIGS. 5A and 5B) are stored in the setting DB 400, upon reception of a login of a new user (for example, a sixth user), the virtual storage area may be prepared to store a personal setting value of this user.

Next, in step S4009, the setting value setting control unit 204 instructs the display operation control unit 201 to display a warning screen for notifying the user that the virtual storage area is to be used. Through the display, the user recognizes that a personal setting value is only temporarily stored. As an example of the warning screen, for example, a warning screen like a screen illustrated in FIG. 7 is displayed. Then, for example, upon pressing of "OK" on the warning screen illustrated in FIG. 7, the present login processing is ended.

The present exemplary embodiment has been described based on the example in which the virtual storage area is prepared and the warning is displayed at the time of the login, but this is not the limiting case. For example, when the user uses a function of each Function, the virtual storage area may be held and the warning may be displayed, or the user may be notified by, for example, the change of a color of the item of the setting to be stored in the virtual storage area. Further, the warning may be issued not only by the display but also by sound, lighting of a lamp, and the like.

Further, the authentication method has been described based on the example in which the user inputs the username and the password from the login screen to be authenticated, but the authentication method is not limited thereto. The user may be authenticated by another authentication method, such as authentication using a noncontact-type integrated circuit (IC) card. The setting value of a group is not illustrated in the above-described flowchart, but can be handled in a similar manner to the personal setting value by calculating the size of the remaining storage capacity and preparing a virtual storage area for the group setting value.

Figure 8:
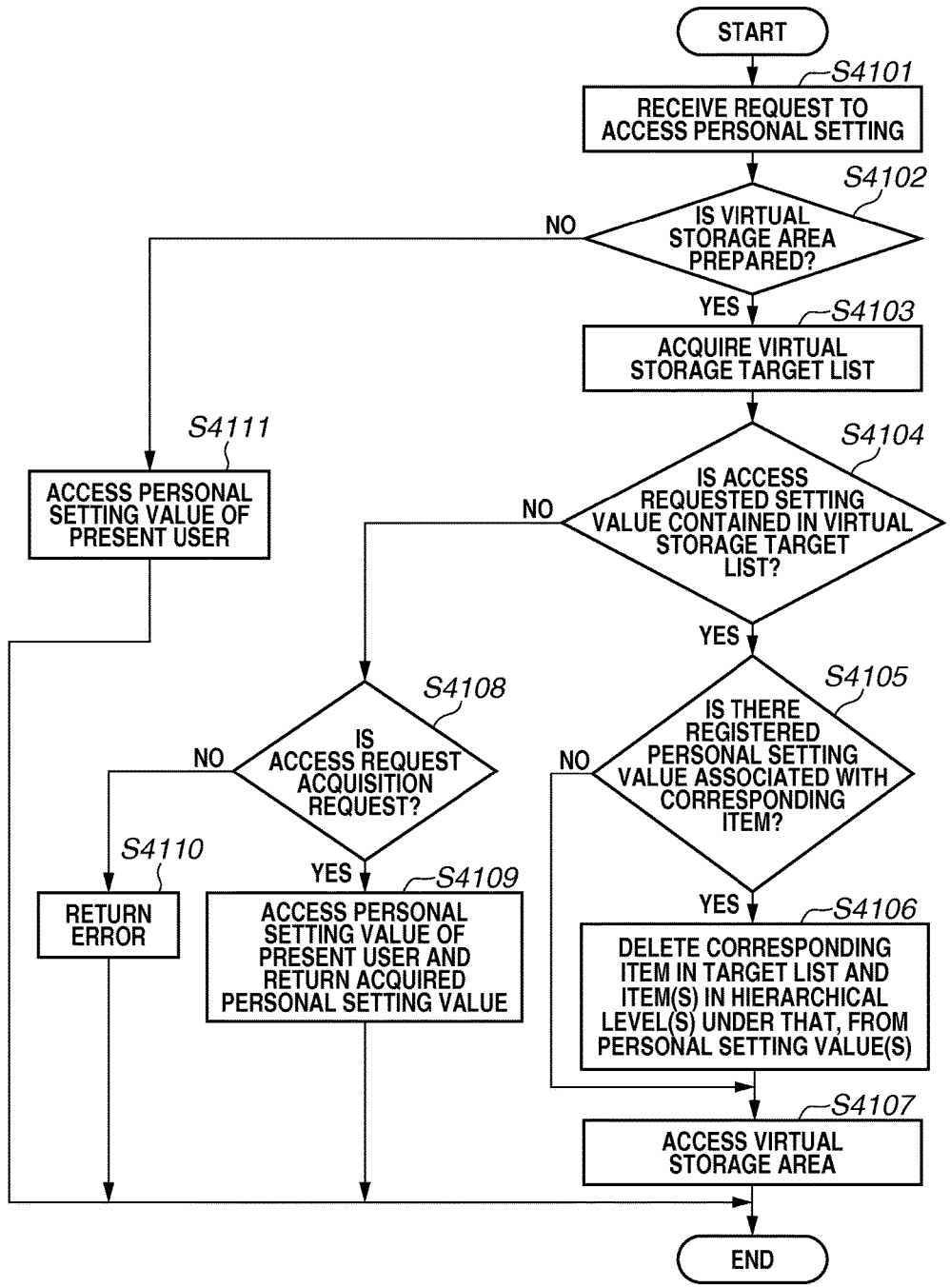
FIG. 8 is a flowchart illustrating an example of processing performed when a personal setting value is accessed.

FIG. 8 is a flowchart illustrating an example of processing performed when a request to access a personal setting value is issued. The processing illustrated in this flowchart is performed by each control unit illustrated in FIG. 2. In other words, the CPU 111 executes the program stored in the ROM 113, whereby this processing is realized.

In step S4101, the setting value setting control unit 204 receives a request to access a personal setting value from one of the Functions. Then, the processing proceeds to step S4102. One of the Functions here means one of the functions mounted in the MFP 101, such as the copy control unit 210, the scan control unit 211, and the transmission control unit 212. For example, one possible case is that the copy control unit 210 accesses the personal setting value, attempting to use the history.

In step S4102, the setting value setting control unit 204 determines whether the virtual storage area is prepared (whether to use the virtual storage area). More specifically, the setting value setting control unit 204 checks the not-illustrated virtual storage area use flag indicated in the above-described step S4008 illustrated in FIG. 6, and determines that the virtual storage area is prepared if the virtual storage area use flag is set (set to ON). On the other hand, the setting value setting control unit 204 determines that the virtual storage area is not prepared if the virtual storage area use flag is not set (set to OFF).

If the setting value setting control unit 204 determines in the above-described step S4102 that the virtual storage area is not prepared (determines not to use the virtual storage area) (NO in step S4102), the processing proceeds to step S4111.

In step S4111, the setting value setting control unit 204 accesses the personal setting value of the present user for which the request has been received in the above-described step S4101 since the setting value setting control unit 204 does not use the virtual storage area. The setting value setting control unit 204 can carry out all types of access, such as setting, acquisition, and deletion, as the access at this time.

On the other hand, if the setting value setting control unit 204 determines in the above-described step S4102 that the virtual storage area is prepared (determines to use the virtual storage area) (YES in step S4102), the processing proceeds to step S4103.

In step S4103, the setting value setting control unit 204 acquires the information in the virtual storage target list. As a specific example, the setting value setting control unit 204 acquires the respective keys specified as the targets to be stored in the virtual storage area from the virtual storage target list table like the above-described example illustrated in FIG. 5D.

Next, in step S4104, the setting value setting control unit 204 determines whether the setting value corresponding to the access request received in the above-described step S4101 is contained in the virtual storage target list acquired in the above-described step S4103.

Then, if the setting value setting control unit 204 determines that the setting value corresponding to the received access request is contained in the virtual storage target list (YES in step S4104), the processing proceeds to step S4105 for accessing the virtual storage area.

On the other hand, if the setting value setting control unit 204 determines that the setting value corresponding to the received access request is not contained in the virtual storage target list (NO in step S4104), the processing proceeds to step S4108.

Now, an example will be described below with reference to the table illustrated in FIG. 5D.

Suppose that a request to access a personal setting value "/transmission/history" is issued. This is an access request that matches "/transmission/history" 803, and therefore is determined to be a request involving access to the virtual storage area. Further, this determination may be made based on not only an exact match but also a prefix match. For example, suppose that a request to access a personal setting value "/copy/history" is issued. This is an access request that matches "/copy" 802 as the prefix match, and therefore is determined to be a request involving access to the virtual storage area. This mechanism allows all of the specified function or item, and an item or items in a hierarchical level or hierarchical levels under that to be set as the targets to be stored in the virtual storage area.

Step S4108 is a process performed when the setting value setting control unit 204 determines in the above-described step S4102 that the virtual storage area has been prepared (determines to use the virtual storage area) (YES in step S4102), but the setting value requested to be accessed is determined in the above-described step S4104 to be not the storage target to be stored in the virtual storage area (NO in step S4104). In this case, if the personal setting value is already registered, the user is permitted to refer to this value, but is prohibited from, for example, adding a new value, deleting the value, and editing the value.

For example, an example will be described now with reference to the table illustrated in FIG. 5D. Suppose that a request to access "/personal address book/personal address 1" is received in step S4101. In this case, the setting value setting control unit 204 determines NO in step S4104 since "/personal address book/personal address 1" is not contained in the virtual storage target list table. Therefore, if the setting value "personal address book" is already registered, the user is permitted to refer to the personal address book, but is prohibited from newly adding a destination to the personal address book, and adding, editing, and deleting the existing personal address book. This processing is performed in steps S4108 to S4110. Now, this processing will be described in detail.

In step S4108, the setting value setting control unit 204 determines whether the access request received in the above-described step S4101 is an acquisition request or another request than the acquisition request (an addition, editing, or the deletion).

Then, if the setting value setting control unit 204 determines that the received access request is the acquisition request (YES in step S4108), the processing proceeds to step S4109. Since the request received in the above-described step S4101 is the acquisition request, in step S4109, the setting value setting control unit 204 accesses the personal setting value of this user, acquires the setting value requested in step S4101, and then returns the acquired setting value to the request source.

On the other hand, if the setting value setting control unit 204 determines in the above-described step S4108 that the access request received in the above-described step S4101 is another request than the acquisition request (NO in step S4108), the processing proceeds to step S4110. Since the request received in the above-described step S4101 is another request than the acquisition request, in step S4110, the setting value setting control unit 204 returns an error to the request source because the personal setting value cannot be updated.

Further, in step S4105, the setting value setting control unit 204 determines whether there is registered a personal setting value associated with the item in the virtual storage target list that corresponds to the setting value determined to be contained in the virtual storage target list in the above-described step S4104. Then, if the setting value setting control unit 204 determines that there is registered the personal setting value associated with this item (YES in step S4105), the processing proceeds to step S4106.

In step S4106, the setting value setting control unit 204 deletes the corresponding item in the virtual storage target list that corresponds to the setting value determined to be contained in the virtual storage target list in the above-described step S4104, and a setting value or setting values in a hierarchical level or hierarchical levels under that, from the personal setting value(s) of the user who is currently logged in. In other words, the setting value setting control unit 204 deletes all setting values including the corresponding key in the virtual storage target list that corresponds to the setting value for which the access request has been received in the above-described step S4101, from the personal setting value(s) of the user who is currently logged in. Then, the processing proceeds to step S4107.

A specific example of the above-described steps S4105 and S4106 will be described now with reference to the table illustrated in FIG. 5D by way of example. Suppose that a request to access "/copy/history/history 1" is issued in the above-described step S4101. In this case, "/copy" (802) corresponds to this setting value among targets listed in the virtual storage target list illustrated in the table of FIG. 5D, so the setting value setting control unit 204 deletes all personal setting values of this user that are associated with keys containing "/copy".

On the other hand, if the setting value setting control unit 204 determines in the above-described step S4105 that there is registered no personal setting value associated with the item in the virtual storage target list that corresponds to the setting value determined to be contained in the virtual storage target list in the above-described step S4104 (NO in step S4105), the processing directly proceeds to step S4107.

In step S4107, the setting value setting control unit 204 accesses the virtual storage area with respect to the setting value determined to be contained in the virtual storage target list in the above-described step S4104. Since this is the key for which the user is permitted to access the virtual storage area, the access at this time may be not only the acquisition request but also the addition, the editing, and the deletion.

In the above description, the present flowchart has been described assuming that the MFP 101 is configured to delete the setting value of the virtual storage area in step S4106 regardless of the type (the acquisition, the addition, the editing, the deletion, and the like) of the access request received in the above-described step S4101. However, the MFP 101 may be configured not to delete the virtual storage target area if the access request received in the above-described step S4101 is the acquisition request.

Figure 9:
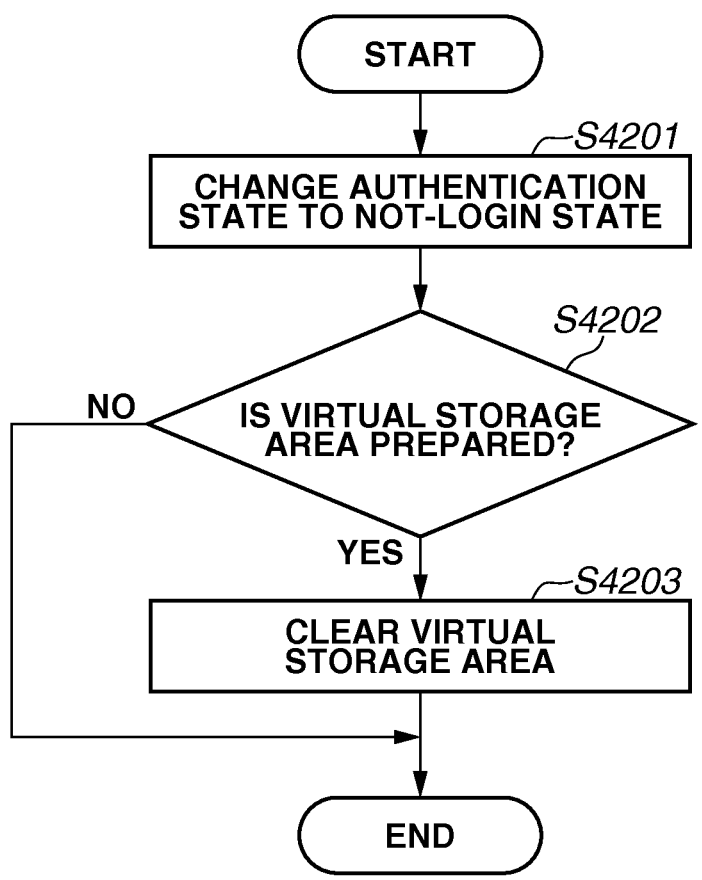
FIG. 9 is a flowchart illustrating an example of logout processing.

FIG. 9 is a flowchart illustrating an example of processing performed when a user logs out from the MFP 101. The processing illustrated in this flowchart is performed by each control unit illustrated in FIG. 2. In other words, the CPU 111 executes the program stored in the ROM 113, whereby this processing is realized.

In step S4201, upon receiving a logout request from a user via the touch panel 118, the display operation control unit 201 changes the authentication state from the login state to the not-login state.

Next, in step S4202, the setting value setting control unit 204 checks whether the virtual storage area is prepared, by determining whether the not-illustrated virtual storage area use flag is set.

Then, if the setting value setting control unit 204 determines that the virtual storage area is prepared (YES in step S4202), the processing proceeds to step S4203.

In step S4203, the setting value setting control unit 204 instructs the setting value storage control unit 203 to delete the virtual storage area to clear the content of the virtual storage area in the setting DB 400, and then ends the processing. At this time, the setting value setting control unit 204 may unset the virtual storage area use flag (set the virtual storage area use flag to OFF).

On the other hand, if the setting value setting control unit 204 determines in the above-described step S4202 that the virtual storage area is not prepared (NO in step S4202), the setting value setting control unit 204 ends the logout processing.

According to the present exemplary embodiment, when the storage capacity already occupied by the login user approaches the upper limit imposed on the storage capacity for the login user, the MFP 101 temporarily stores only the specified setting value, such as the setting value to be automatically stored, into the virtual storage area, and deletes the setting value stored in the personal setting value of the user that corresponds to the setting value to be stored in the virtual storage area. This configuration allows the MFP 101 to temporarily store the setting value of the predetermined function or item in the virtual storage area only while the user is logged in, even when the occupied storage capacity reaches the upper limit imposed on the storage size of the setting values for each user, or even when the area available for storing the setting values reduces, so that the MFP 101 is placed into the state in which a personal setting value cannot be stored. This prevents the MFP 101 from failing to store, for example, the setting value that the system is supposed to automatically store, such as the history of the copy function, thereby preventing the user from being confused anymore. Further, the MFP 101 can avoid confusing the user even when the user becomes able to access the personal setting value again by, when the user accesses the virtual storage area, deleting the corresponding setting value already stored by this user.

Next, a second exemplary embodiment will be described.

The above-described first exemplary embodiment has been described as the configuration of deleting the corresponding setting value from the personal setting value(s) upon receiving the request to access the function or the item specified as the target item to be stored in the virtual storage area. Therefore, the above-described first exemplary embodiment is such a configuration that a personal setting value of an unused function or item remains stored even in the state in which the virtual storage area is accessed. This configuration allows the user to use the previously stored setting value with respect to the function or item unused during the use of the virtual storage area, when the available storage area increases, so that the MFP 101 returns to the state that does not require the use of the virtual storage area. However, in this case, the processing is performed every time the user accesses a function or an item, which may affect a processing time of the function.

Therefore, in the second exemplary embodiment, the MFP 101 is configured to collectively delete the target functions and items to be stored in the virtual storage area, from the personal setting value(s) of a user, at a timing relating to a login of this user, such as a moment when the user logs in. Now, the second exemplary embodiment will be described in detail.

Figure 10:
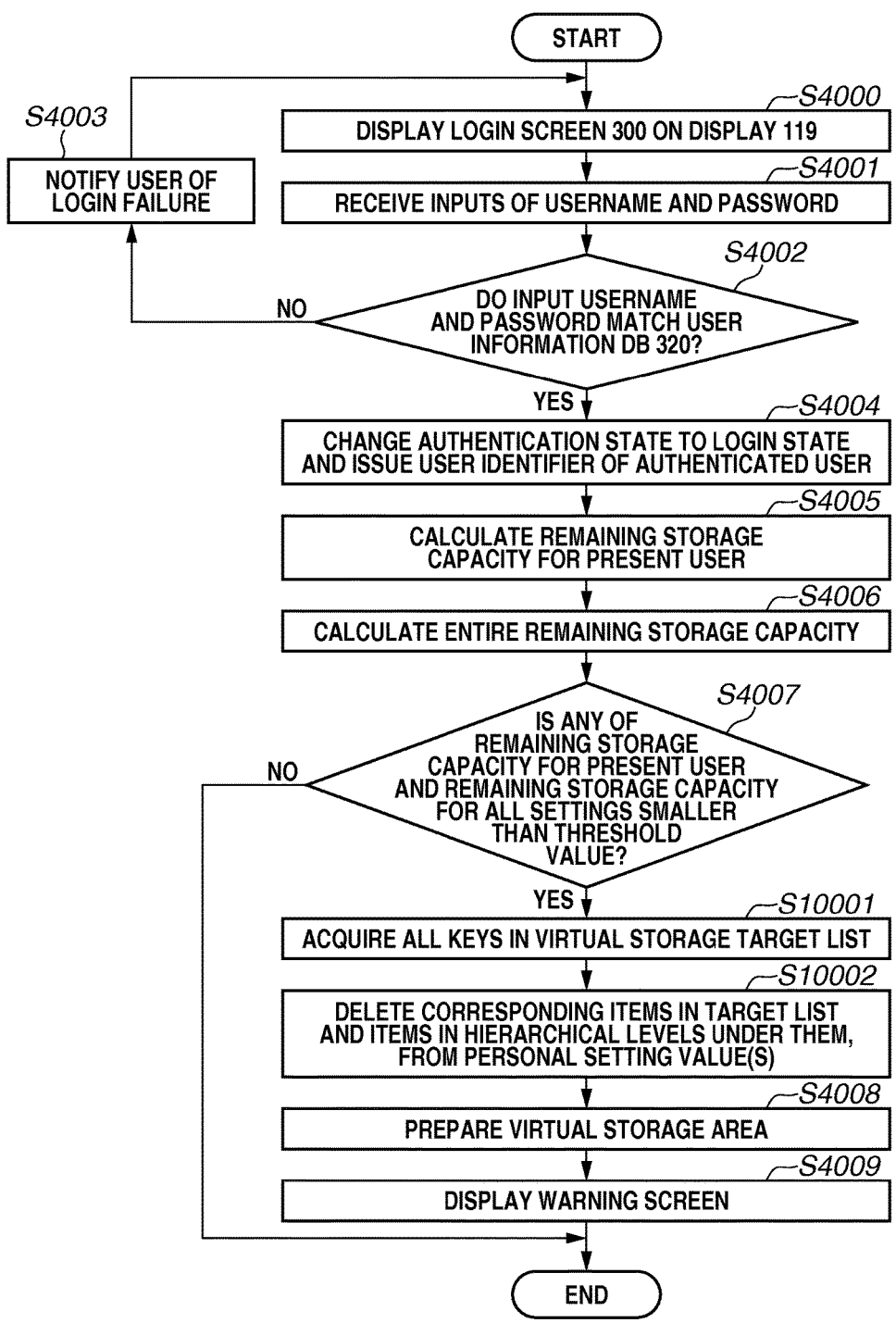
FIG. 10 is a flowchart illustrating an example of login processing according to a second exemplary embodiment.

FIG. 10 is a flowchart illustrating an example of login processing performed by the MFP 101 according to the second exemplary embodiment. The processing illustrated in this flowchart is performed by each control unit illustrated in FIG. 2. In other words, the CPU 111 executes the program stored in the ROM 113, whereby this processing is realized. In FIG. 10, similar steps to the steps illustrated in FIG. 6 are identified by the same step numbers. In the following description, only processes operating differently from FIG. 6 will be described.

In step S4007, if the setting value setting control unit 204 determines that even any one of the remaining storage capacity for the user and the remaining storage capacity for the all settings is smaller than the threshold value (YES in step S4007), the processing proceeds to step S10001.

In step S10001, the setting value setting control unit 204 acquires all of the keys in the virtual storage target list. For example, the setting value setting control unit 204 acquires the respective keys specified as the targets to be stored in the virtual storage area, from the virtual storage target list table like the example illustrated in FIG. 5D.

Next, in step S10002, the setting value setting control unit 204 deletes all of the items in the virtual storage target list acquired in the above-described step S10001 and items in hierarchical levels under them, from the personal setting value(s) of this user. Then, the processing proceeds to step S4008.

In the second exemplary embodiment, assume that the processes of steps S4105 and S4106 are omitted from the processing performed when a Function accesses a personal setting value (the flowchart illustrated in FIG. 8), although this is not illustrated. In other words, in the second exemplary embodiment, the processing at this time is configured in such a manner that, if the setting value setting control unit 204 determines YES in step S4104 in FIG. 8, subsequently, the process of step S4107 is performed.

In this manner, according to the second exemplary embodiment, the MFP 101 collectively deletes the corresponding items in the virtual storage target list and the items in the hierarchical levels under them at the time of the login, and omits the deletion processing at the time of the access to the function or the item, thereby enabling the speedup of the processing of the Function.

Next, a third exemplary embodiment will be described.

The third exemplary embodiment is a configuration of storing, as the personal setting value of the user, the setting value held in the virtual storage area, when the administrator, for example, deletes unnecessary data to increase the capacity for storing the personal setting values. In the following description, the third exemplary embodiment will be described in detail.

Figure 11:
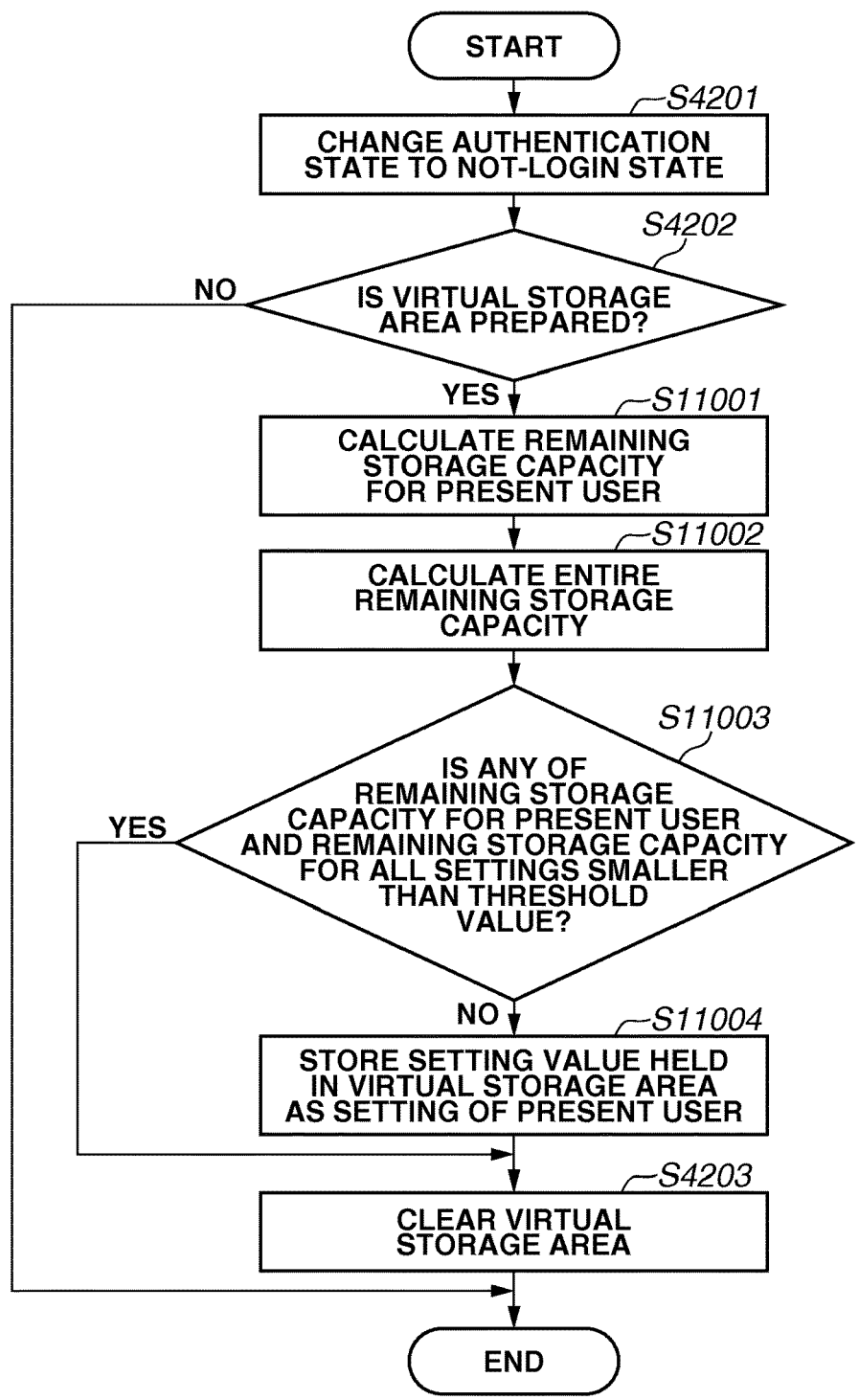
FIG. 11 is a flowchart illustrating an example of logout processing according to a third exemplary embodiment.

FIG. 11 is a flowchart illustrating an example of logout processing performed by the MFP 101 according to the third exemplary embodiment. The processing illustrated in this flowchart is performed by each control unit illustrated in FIG. 2. In other words, the CPU 111 executes the program stored in the ROM 113, whereby this processing is realized. In FIG. 11, similar steps to the steps illustrated in FIG. 9 are identified by the same step numbers. In the following description, only processes operating differently from FIG. 9 will be described.

If the setting value setting control unit 204 determines in step S4202 that the virtual storage area is prepared (YES in step S4202), the processing proceeds to step S11001. Steps S11001 and S11002 are similar processes to steps S4005 and S4006 illustrated in FIG. 6, so descriptions thereof will be omitted here. After the process of step S11002, the processing proceeds to step S11003.

In step S11003, the setting value setting control unit 204 determines whether at least one of the remaining storage capacity for the present user, which has been calculated in step S11001, and the remaining storage capacity for the all personal setting values, which has been calculated in step S11002, is smaller than the threshold value.

Then, if the setting value setting control unit 204 determines that at least one of the remaining storage capacity for the user and the remaining storage capacity for the all settings is smaller than the threshold value (YES in step S11003), the processing proceeds to step S4203.

On the other hand, if the setting value setting control unit 204 determines that both the remaining storage capacity for the user and the remaining storage capacity for the all settings are not smaller than the threshold values in the above-described step S11003 (NO in step S11003), the processing proceeds to step S11004. In step S11004, the setting value setting control unit 204 stores (copies) the setting value held in the virtual storage area, as the personal setting value of the present user. In other words, when there is a capacity sufficient to store the setting value held in the virtual storage area, the setting value setting control unit 204 stores the setting value held in the virtual storage area, as the personal setting value.

In this manner, according to the third exemplary embodiment, when the remaining capacity available for storing the personal setting values of a user who is being processed by the logout processing increases, and the MFP 101 accordingly returns into the state in which the setting value can be stored, the setting value held in the virtual storage area can be stored as the personal setting value of this user.

Next, a fourth exemplary embodiment will be described.

In the above-described first exemplary embodiment, the MFP 101 clears the virtual storage area at the time of the logout. In the fourth exemplary embodiment, the MFP 101 is configured not to clear the virtual storage area at the time of the logout, unlike the first exemplary embodiment, so as to allow the setting value stored in the virtual storage area to be reused when the same user logs in successively.

FIG. 12 is a flowchart illustrating an example of login processing performed by the MFP 101 according to the fourth exemplary embodiment. The processing illustrated in this flowchart is performed by each control unit illustrated in FIG. 2. In other words, the CPU 111 executes the program stored in the ROM 113, whereby this processing is realized. In FIG. 12, similar steps to the steps illustrated in FIG. 6 are identified by the same step numbers. In the following description, only processes operating differently from FIG. 6 will be described.

As described above, in the fourth exemplary embodiment, the MFP 101 does not clear the virtual storage area at the time of the logout, unlike the first exemplary embodiment. Logout processing according to the fourth exemplary embodiment is performed according to the flowchart illustrated in FIG. 9 with steps S4202 and S4203 removed therefrom, although this processing is not specifically illustrated.

After the process of step S4008, the processing proceeds to step S12001. In step S12001, the setting value setting control unit 204 determines whether user information stored in the virtual storage area and the user information of the present login are the same. In the fourth exemplary embodiment, the virtual storage area contains a storage area for holding the user identifier. In the above-described step S12001, the setting value setting control unit 204 makes the above-described determination by comparing the user identifier stored in the virtual storage area and the user identifier of the user who is currently logged in.

Then, if the setting value setting control unit 204 determines that the user information stored in the virtual storage area and the user information of the present login are the same (YES in step S12001), the processing proceeds to step S4009. In this case, the virtual storage area remains without being deleted, which allows the setting at the time of the previous login to be used.

On the other hand, if the setting value setting control unit 204 determines in the above-described step S12001 that the user information stored in the virtual storage area and the user information of the present login are not the same (NO in step S12001), the processing proceeds to step S12002. The processing proceeds to this step in a case where a user that has used the virtual storage area during a login immediately before that and the user being processed by the present login processing are different users.

In step S12002, the setting value setting control unit 204 instructs the setting value storage control unit 203 to delete the virtual storage area to clear the content of the virtual storage area in the setting DB 400. Assume that, at this time, the user identifier of the user who is currently logged in is stored into the virtual storage area. After step S12002, the processing proceeds to step S4009.

In the above description, the fourth exemplary embodiment has been described assuming that the MFP 101 makes the determination in the above-described step S12001 by comparing the user identifier stored in the virtual storage area and the user identifier of the user who is currently logged in. However, the MFP 101 may be configured to simply store the user identifier of the user who has been logged in last time into a log stored in the storage device 120 or the like, and make the determination in the above-described step S12001 by comparing this stored user identifier of the user who has been logged in last time and the user identifier of the user who is currently logged in.

In this manner, according to the fourth exemplary embodiment, the setting value stored in the virtual storage area last time can be used when the same user logs in successively, which can improve convenience for the user.

In this manner, even when the occupied storage capacity reaches the upper limit imposed on the capacity for the setting values storable by one user, or even when the storage area for the personal setting values is filled up, only the setting value supposed to be automatically stored can be temporarily stored, which can reduce user's time and effort. Further, the automatically stored setting value is recorded only while this user is logged in, and the corresponding personal setting value of the user is deleted, which can eliminate such a possibility that the user may access the previous setting by mistake.

Therefore, an exemplary embodiment can achieve a technical effect of, for example, enabling the personal setting value to be desirably stored or deleted without requiring the user to spend time and effort.

It is apparent that the configurations and the contents of the above-described various kinds of data are not limited to the described ones, and these kinds of data can be configured in various manners and can contain various contents according to the usage and the purpose.

An exemplary embodiment has been described above, but additional exemplary embodiments can be implemented as a system, an apparatus, a method, a program, and a storage medium. More specifically, exemplary embodiments may be applied to a system including a plurality of devices, and may be also applied to an apparatus including a single device.

Further, all possible combinations of the above-described exemplary embodiments are also included.

Embodiment(s) can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-129886, filed Jun. 25, 2014, which is hereby incorporated by reference herein in its entirety.

What is claimed is:

1. An image forming apparatus comprising:
a storage configured to store a personal setting value of a user in a first storage area;
a processor; and
a memory storing a computer code, which when executed by the processor, causes the processor to function as:
an executing unit configured to execute a login of the user;
a control unit configured to determine whether the personal setting value of the user who logs into the image forming apparatus can be stored in the first storage area, and in a case where it is determined that the personal setting value cannot be stored and registration of the personal setting value is instructed by the user, perform control so as to store the personal setting value of which the registration is instructed in a second storage area; and
a holding unit configured to hold information about personal setting subject to storage into the second storage area, the information about the personal setting including information about a transmission function of the image forming apparatus,
wherein a first personal setting value of the user stored in the first storage area is not deleted when the user logs out, and a second personal setting value stored in the second storage area is deleted when the user logs out, and
wherein the control unit performs control to store the personal setting value of which the registration is instructed in the second storage area in a case where it is determined that the personal setting value instructed by the user is a value associated with the information about the personal setting subject to storage, held by the holding unit, and to prohibit to store the personal setting value of which the registration is instructed in a case where it is determined that the personal setting value instructed by the user is a value not associated with the information about the personal setting subject to storage, held by the holding unit.

2. The image forming apparatus according to claim 1, wherein the personal setting value is information about a display language.

3. The image forming apparatus according to claim 1, wherein the personal setting value is setting information of an executed job.

4. The image forming apparatus according to claim 1, wherein, when a free space of the storage is less than a threshold value, the control unit determines that the personal setting value of the user who logs into the image forming apparatus cannot be stored in the first storage area.

5. The image forming apparatus according to claim 1, wherein, in a state in which personal setting values of a predetermined number of users are stored in the first storage area, when the execution unit executes a login of a user whose personal setting is not stored, the control unit determines that the personal setting value of this user cannot be stored in the first storage area.

6. The image forming apparatus according to claim 1, wherein the control unit deletes a setting value corresponding to a same function or a same item as a function or an item corresponding to the personal setting value stored in the second storage area from a setting value or setting values stored in the first storage area for the user who is currently logged in.

7. The image forming apparatus according to claim 1, wherein, when a user logs in, the control unit determines whether the user who logs in and a user who had been logged in at the time of storage of the setting value stored in the second storage area are a same user, and wherein, in a case where it is the same user, the control unit does not delete the setting value stored in the second storage area, and in a case where it is not the same user, the control unit deletes the setting value stored in the second storage area.

8. The image forming apparatus according to claim 1, further comprising a display configured to, in a case where the personal setting value cannot be stored, display to the user who is currently logged in a warning message indicating that the personal setting value cannot be stored.

9. A method for controlling an image forming apparatus including a storage configured to store a personal setting value of a user in a first storage area, the method comprising:

executing, by a processor, a login of the user;

determining, by a processor, whether the personal setting value of the user who logs into the image forming apparatus can be stored in the first storage area;

storing, by a processor, in a case where it is determined that the personal setting value cannot be stored and registration of the personal setting value is instructed by the user, the personal setting value of which the registration is instructed in a second storage area; and holding information about personal setting subject to storage into the second storage area, the information about the personal setting including information about a transmission function of the image forming apparatus, wherein a first personal setting value of the user stored in the first storage area is not deleted when the user logs out, and a second personal setting value stored in the second storage area is deleted when the user logs out, and wherein the personal setting value of which the registration is instructed is stored in the second storage area in a case where it is determined that the personal setting value instructed by the user is a value associated with the information about the personal setting subject to storage, and the personal setting value of which the registration is instructed is prohibited from being stored in a case where it is determined that the personal setting value instructed by the user is a value not associated with the information about the personal setting subject to storage.

10. A non-transitory computer-readable storage medium storing computer executable instructions for causing a computer to execute a method for controlling an image forming apparatus including a storage configured to store a personal setting value of a user in a first storage area, the method comprising:

executing a login of the user;

determining whether the personal setting value of the user who logs into the image forming apparatus can be stored in the first storage area; and storing, in a case where it is determined that the personal setting value cannot be stored and registration of the personal setting value is instructed by the user, the personal setting value of which the registration is instructed in a second storage area; and holding information about personal setting subject to storage into the second storage area, the information about the personal setting including information about a transmission function of the image forming apparatus, wherein a first personal setting value of the user stored in the first storage area is not deleted when the user logs out, and a second personal setting value stored in the second storage area is deleted when the user logs out, and wherein the personal setting value of which the registration is instructed is stored in the second storage area in a case where it is determined that the personal setting value instructed by the user is a value associated with the information about the personal setting subject to storage, and the personal setting value of which the registration is instructed is prohibited from being stored in a case where it is determined that the personal setting value instructed by the user is a value not associated with the information about the personal setting subject to storage.

* * * * *